United States Patent
Schmidt

(10) Patent No.: US 7,308,345 B2
(45) Date of Patent: Dec. 11, 2007

(54) STEERING ASSISTANCE METHOD AND DEVICE FOR A MOTOR VEHICLE

(75) Inventor: Christian Schmidt, Erfurt (DE)

(73) Assignee: Magna Donnelly GmbH & Co. KG, Dorfprozelten (DE)

( * ) Notice: Subject to any disclaimer, the term of this patent is extended or adjusted under 35 U.S.C. 154(b) by 220 days.

(21) Appl. No.: 11/141,976

(22) Filed: Jun. 1, 2005

(65) Prior Publication Data
US 2005/0269145 A1 Dec. 8, 2005

(30) Foreign Application Priority Data
Jun. 3, 2004 (DE) .................. 10 2004 027 250

(51) Int. Cl.
*G08G 1/14* (2006.01)
(52) U.S. Cl. ........................ 701/41; 340/435
(58) Field of Classification Search ................ 701/23, 701/24, 25, 26, 36, 41; 180/168, 199, 204, 180/271; 348/113, 118, 119, 143, 148; 340/435, 340/436, 437
See application file for complete search history.

(56) References Cited

U.S. PATENT DOCUMENTS

| | | | |
|---|---|---|---|
| 4,931,930 A | 6/1990 | Shyu | |
| 5,029,088 A * | 7/1991 | Minami | 701/23 |
| 5,563,787 A * | 10/1996 | Murayama | 701/23 |
| 6,825,880 B2 * | 11/2004 | Asahi et al. | 348/333.02 |
| 6,929,082 B2 * | 8/2005 | Kataoka et al. | 180/204 |
| 6,950,035 B2 * | 9/2005 | Tanaka et al. | 340/932.2 |
| 7,012,548 B2 * | 3/2006 | Ishii et al. | 340/932.2 |

FOREIGN PATENT DOCUMENTS

| | | |
|---|---|---|
| DE | 31 35 117 A1 | 4/1982 |
| DE | 38 13 083 C3 | 11/1989 |
| DE | 198 09 416 A1 | 9/1999 |
| DE | 199 40 007 A1 | 3/2001 |

\* cited by examiner

*Primary Examiner*—Dalena Tran
(74) *Attorney, Agent, or Firm*—McGlew and Tuttle, P.C

(57) ABSTRACT

A method for the assisted steering, particularly the assisted maneuvering and parking, of a motor vehicle which includes determining a nominal driving path (X) with a starting point (S) and a destination point ($W_{nominal}$); providing an output of the nominal driving path (X), and setting the motor vehicle in motion. An actual position ($W_1$) of the motor vehicle is determined, wherein a deviant circular arc ($K_A$) traveled as well as a first ($K_1$) and a second ($K_2$) corrective circular arc are determined if the actual position ($W_1$) deviates from the nominal driving path (X). The second corrective circular arc ($K_2$) is a congruent projection of the deviant circular arc ($K_A$) and ends at the destination point ($W_{nominal}$). A corrected nominal driving path ($K_1$, $K_2$) is provided as an output.

20 Claims, 4 Drawing Sheets

STEERING ASSISTANCE METHOD AND DEVICE FOR A MOTOR VEHICLE

CROSS REFERENCE TO RELATED APPLICATIONS

This application claims the benefit of priority under 35 U.S.C. § 119 of German Application DE 10 2004 027 250.6 filed Jun. 3, 2004, the entire contents of which are incorporated herein by reference.

FIELD OF THE INVENTION

The invention pertains to a method and a device for the assisted steering, particularly the assisted maneuvering and parking, of a motor vehicle.

BACKGROUND OF THE INVENTION

So-called driver assistance systems for assisting the driver of a motor vehicle in maneuvering, parking in and/or parking out are known from the state of the art. A driver assistance system typically comprises a sensor arrangement that surveys the surroundings of the motor vehicle, for example, by means of ultrasonic sensors. Known driver assistance systems are designed, in particular, for surveying a parking spot and for assisting the driver in parking the motor vehicle in a parking spot.

A parking assistant is known, for example, from DE 198 09 416 A1. In this case, a driving maneuver calculated by a data processing unit is displayed to the driver of the motor vehicle and information on steering the motor vehicle to a certain destination is provided. In a method carried out with this system, a potential parking spot is approached and surveyed by sensors arranged on the motor vehicle. Subsequently, it is determined whether or not the size of the parking spot suffices for parking in the respective motor vehicle based on stored reference values. If the parking spot has a sufficient size, a parking strategy is calculated in dependence on the dimensions of the parking spot and displayed to the driver of the motor vehicle on a display unit. The driver is then able to execute the proposed parking strategy. While the motor vehicle is maneuvered into the parking spot, a comparison between actual and nominal values is carried out such that a corrected parking strategy can be calculated in dependence on possible deviations. However, the method described in DE 198 09 416 A1 does not provide any information as to how such a correction is carried out.

A parking aid for a motor vehicle is also known from DE 38 13 083 C3. This parking aid comprises distance measuring devices, a data processing unit, control devices and a display unit. Information on a parking maneuver is made available to the driver of the motor vehicle such that the motor vehicle can be steered to a certain destination.

A system-planned driving maneuver basically corresponds to a geometric curve that is composed of at least one, usually of more than one, segment in the shape of a circular arc and/or a straight line. This geometric curve is described by the movement of a certain point on the motor vehicle. The display of the driving maneuver refers to a nominal steering angle and a nominal driving distance for each segment. For example, if a driver executes a system-planned driving maneuver, the actual motor vehicle position and the actual motor vehicle orientation may deviate from the calculated nominal position and the calculated nominal orientation. In this context, the term orientation refers to the alignment of the longitudinal axis of the motor vehicle. Such deviations may occur, in particular, if the displayed nominal steering angle is not observed. Inaccurate steering movements by the driver of the motor vehicle, an inadequate observation of the displayed nominal steering angle and system-related tolerances, e.g., the steering wheel play, may be responsible for these deviations

SUMMARY OF THE INVENTION

The invention is based on the objective of developing a method and a device for the assisted steering of a motor vehicle which provide a reliable corrective option such that a planned driving maneuver can be executed accurately despite deviations.

According to the invention, this objective is attained with a method, in which a nominal driving path with a starting point and a destination point is determined, wherein said nominal driving path is output in the form of nominal steering angles and nominal driving distances. The motor vehicle is subsequently set in motion. After a certain distance has been traveled, an actual position of the motor vehicle is determined. If the actual position deviates from the nominal driving path that extends, in particular, along a circular arc, a deviant circular arc as well as a first and a second corrective circular arc are determined, wherein the second corrective circular arc represents a congruent projection of the deviant circular arc and ends at the destination point. Subsequently, a corrected nominal driving path is output based on both corrective circular arcs, wherein this corrected nominal driving path guides the motor vehicle to the intended destination in the properly oriented fashion.

In the method according to the invention, the already traveled driving path that may represent a deviant circular arc is taken into account, wherein a new nominal driving path is calculated, if so required, based on this driving path. The steering instructions of a driver assistance system, particularly a parking assistant, can be corrected on demand in this fashion. The deviant circular arc is defined by the starting point, the actual position of the motor vehicle, a curvature radius and the so called deviant steering angle resulting therefrom. The deviant steering angle is the angle that has been traveled by the motor vehicle on the deviant circular arc at the time the actual position is determined.

The utilization of the method according to the invention makes it possible to position the motor vehicle in question at the destination point such that its orientation corresponds to the orientation achieved by driving the motor vehicle along the originally calculated nominal driving path despite deviations of the actual driving path from the nominal driving path. The output of corrected steering angles and driving distances ensures that the driver of the motor vehicle is provided with sufficient information for positioning the motor vehicle at the destination point with the originally calculated orientation, namely even if deviations from the nominal driving path are unavoidable while a driving maneuver is executed, for example, based on the information displayed on a display unit. This may already occur, for example, if the driver does not turn the steering wheel until the vehicle is already in motion.

In the method according to the invention, the nominal driving path, the deviant circular arc and the corrective circular arcs preferably refer to trajectories, i.e., motion curves of the motor vehicle that are defined by the moving path of the center of the rear axle of the motor vehicle in question.

The nominal driving path typically represents a segment in the form of an ideally circular trajectory with directional information. Such a trajectory can be unequivocally defined by a starting point, a destination point and a center of rotation, wherein the trajectory extends over an angle formed by a line defined by the center of rotation and the starting point on the one hand and a line defined by the center of rotation and the destination point on the other hand. A segment in the form of a straight line occurs when the motor vehicle travels straight and represents a special instance, in which the center of rotation is spaced apart from the starting point and from the destination point by an infinite distance. It suffices to determine the starting point and the destination point in order to describe such a segment.

In one preferred embodiment of the method according to the invention, a deviant center of rotation for the deviant circular arc and a distance between the starting point and the deviant center of rotation are determined, wherein the deviant center of rotation lies on a line defined by the starting point and the nominal center of rotation. Due to these measures, it is easily possible to determine a segment in the form of a circular arc that is defined by the starting point, the actual position and the deviant center of rotation and can be used for calculating the second corrective circular arc in the region of the destination point. For this purpose, a compensative center of rotation assigned to the second corrective circular arc is advantageously determined, wherein this compensative center of rotation lies on a line defined by the destination point and the nominal center of rotation and is spaced apart from the destination point by a distance that corresponds to the distance between the starting point and the deviant center of rotation.

The center of rotation for the first corrective circular arc is advantageously determined by determining the intersecting point between a line defined by the actual position and the deviant center of rotation and a line defined by the compensative center of rotation and the deviant steering angle.

The method according to the invention preferably is carried out in accordance with a preadjusted clocking. The clocking may take place in a time-dependent and/or distance-dependent fashion. The interval between the clock pulses defines the accuracy of the driving maneuver to be executed, as well as the computing expenditure required for carrying out the method.

The nominal driving path and the corrected nominal driving path can be output by means of an optical, acoustical and/or mechanical/haptical indicating unit. For example, the driving or steering maneuvers to be executed can be displayed on a display unit and/or reproduced in the form of acoustic commands. It would also be conceivable to output information by influencing the steering behavior of the motor vehicle. For example, the respective steering angle to be adjusted by the driver can be defined by restricting the steering angle.

In one special embodiment of the method according to the invention, the information is output to an electronic steering aid that automatically adjusts the required steering angle. In this case, it is not necessary for the driver of the motor vehicle to actively influence the steering maneuver in order to optimally align the motor vehicle in accordance with the calculated nominal driving path.

The method according to the invention can be used, in particular, in the assisted parking of a motor vehicle in order to simplify the parking maneuver for the driver of the respective motor vehicle. For example, the method is utilized if the driver of the respective motor vehicle requires assistance in backing into a parking spot in order to parallelpark the motor vehicle. For this purpose, the parking spot is initially surveyed by means of suitable sensors arranged on the motor vehicle. The nominal driving path then corresponds to a parking strategy, according to which the motor vehicle can be parked in the parking spot without collisions and with the least steering and maneuvering effort possible. The parking strategy is developed by compiling several nominal driving paths that are composed of circular arcs and typically requires steering, acceleration and deceleration processes that can be specified for the driver by a system for carrying out the method according to the invention. The output of the parking strategy may be realized with display devices that are provided in the respective motor vehicle anyhow, e.g., the display of a navigation system.

The invention also pertains to a steering assistance device, in particular, for the assisted maneuvering and parking of a motor vehicle. This device comprises a data processing unit for determining a nominal driving path along a circular arc between a starting point and a destination point, an output unit for the nominal driving path and a device for determining a possible deviation between the actual position and the nominal driving path, as well as at least one displacement sensor. The device also comprises a unit that determines a deviant circular arc as well as a first and a second corrective circular arc if the actual position deviates from the nominal driving path, wherein the second corrective circular arc is a congruent projection of the deviant circular arc and ends at the destination point.

The device according to the invention represents, in particular, a parking assistance system that optimally corrects driver-related and/or system related deviations between a nominal driving path and an actual driving path during a parking maneuver.

In one special embodiment, the device according to the invention cooperates, in particular, with a steering angle sensor that makes it possible to take into account a deviation of an actual steering angle from a nominal steering angle in the calculation of the corrective circular arcs.

Alternatively or additionally to the steering angle sensor, the device according to the invention may also cooperate with at least two displacement sensors that are respectively arranged, for example, on the left rear wheel and the right rear wheel of the motor vehicle. Naturally, the displacement sensors may also be assigned to the front wheels.

The device according to the invention may also comprise a timing unit. The timing unit delivers a signal for triggering the determination of the actual position and, if so required, the calculation of a corrected driving path within predetermined intervals. Alternatively, the intervals for determining the actual position and for calculating a corrected driving path may also be determined in a distance-dependent fashion, i.e., by means of a displacement sensor. Naturally, it would also be conceivable to determine the intervals with a time-dependent and distance-dependent function.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Two embodiments of a device according to the invention and two embodiments of a method according to the invention are schematically illustrated in the figures and described in greater detail below. In the drawings.

DESCRIPTION OF THE PREFERRED EMBODIMENTS

Figure 1:
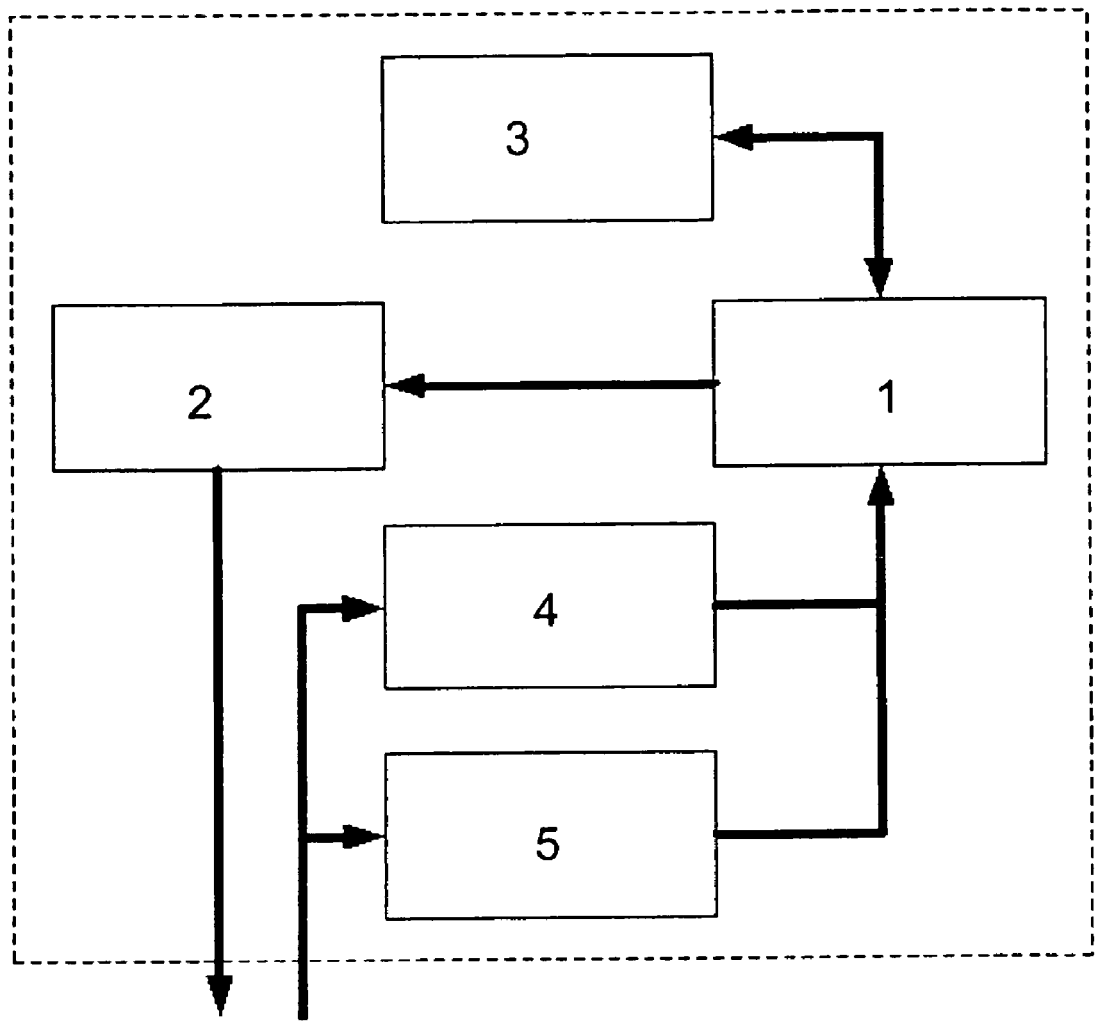
FIG. 1 is a view of first embodiment of a device according to the invention.

Referring to the drawings in particular, FIG. 1 shows a highly schematic representation of a parking assistance device for a motor vehicle. The device comprises a data processing unit 1 for calculating a driving maneuver that is composed of several segments that respectively represent a nominal driving path between a starting point and a destination point. The data processing unit 1 cooperates with a sensor arrangement of the motor vehicle that is not illustrated in greater detail in order to calculate the driving maneuver. The sensor arrangement comprises, for example, ultrasonic sensors for surveying the motor vehicle surroundings, as well as for surveying a parking spot.

The data processing unit 1 is connected to an output unit 2 for outputting the calculated driving maneuver and the segments to be traveled. This output unit may consist, for example, of the display of a navigation system, wherein the driving maneuvers are displayed, for example, in the form of the respective nominal steering angle to be adjusted for each segment and the corresponding distance to be traveled.

The data processing unit 1 also cooperates with a memory 3 for storing the planned nominal driving maneuver that was calculated by the data processing unit 1 based on the data obtained from the sensor arrangement. This means that the segments to be traveled in order to execute the nominal driving maneuver are stored in the memory 3. These segments respectively represent a nominal driving path in the method according to the invention.

A nominal steering angle and a distance to be traveled or remaining distance, respectively, are displayed on the display unit 2 for each segment. The instructions displayed on the display unit 2 are executed by the driver of the motor vehicle and may comprise steering movements, braking maneuvers, acceleration maneuvers or the like.

The device also contains a system 4 for determining the actual steering angle, as well as a displacement sensor 5, in order to determine the respective actual motor vehicle position and thus, the distance traveled during a driving maneuver. The determination of the actual position may take place continuously or in intervals defined by a timing unit. The values determined by means of the system 4 and the displacement sensor 5 are transmitted to the data processing unit 1 in order to calculate, if so required, a deviant circular arc and a first and a second corrective circular arc for the respective segment to be traveled, namely in dependence on a deviation between the nominal values and the actual values. In this case, the second corrective circular arc represents a congruent projection of the deviant circular arc and ends at the destination point.

Figure 2:
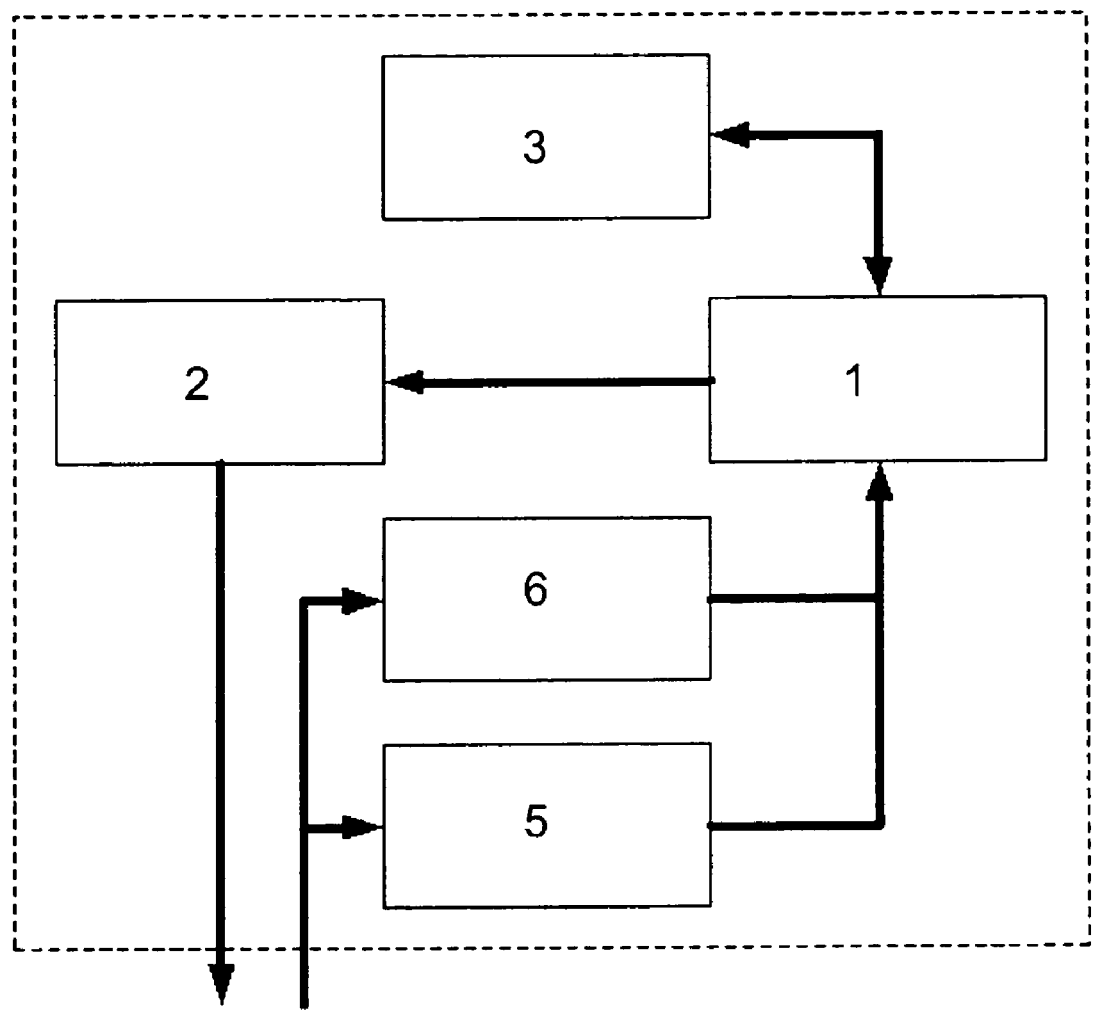
FIG. 2 is a view of a second embodiment of a device according to the invention.

FIG. 2 shows a second embodiment of a parking assistance device for a motor vehicle. The device according to FIG. 2 largely corresponds to the device shown in FIG. 1, but is provided with two displacement sensors 5 and 6 instead of a steering angle sensor. In this case, one displacement sensor is assigned to a left wheel and the other displacement sensor is assigned to a right wheel of the motor vehicle in question. The actual steering angle can also be determined with two displacement sensors of this type.

Figure 3:
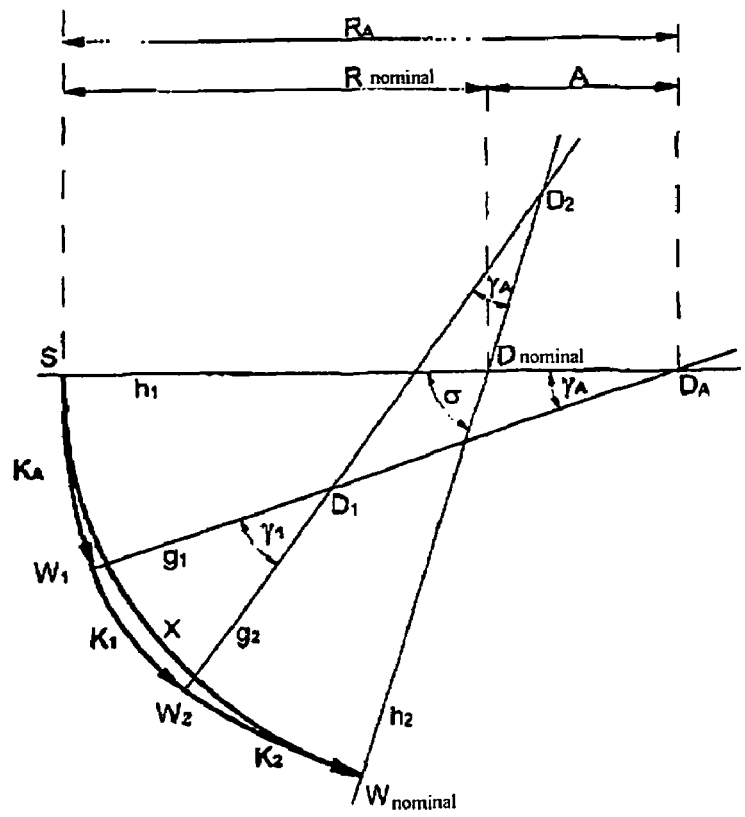
FIG. 3 is a view of a first driving situation during the utilization of the method according to the invention.
Figure 4:
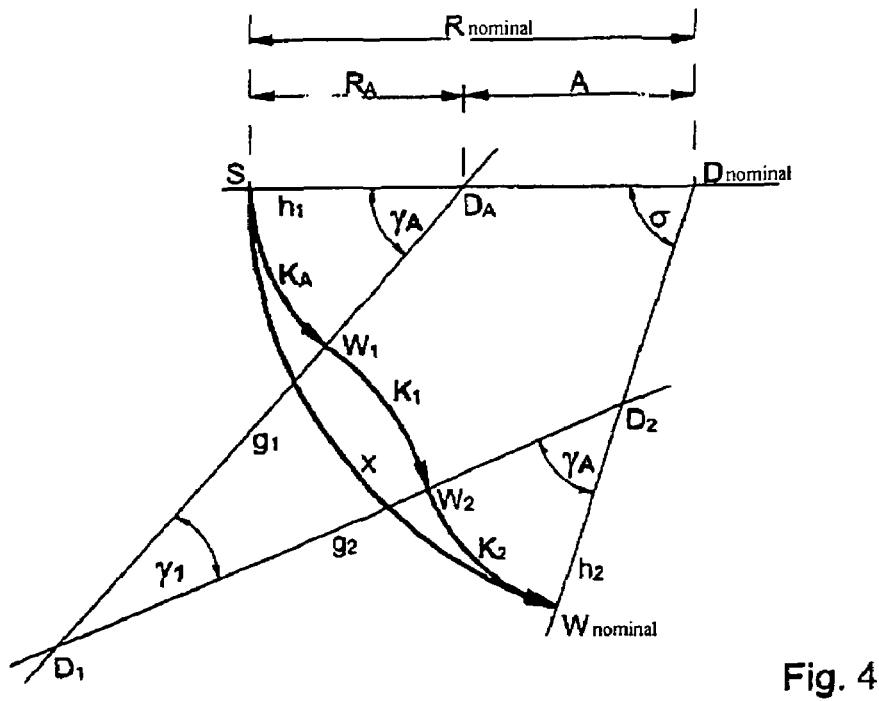
FIG. 4 is a view of a second driving situation during the utilization of the method according to the invention.

FIGS. 3 and 4 respectively show a driving situation, in which an actual driving path deviates from a segment defined by a nominal driving path X. The segment X ideally represents a trajectory in the form of a circular arc with directional information, wherein said trajectory is unequivocally defined by a starting point S, a destination point $W_{nominal}$ and a nominal center of rotation $D_{nominal}$ as well as the resulting nominal radius $R_{nominal}$. The segment X in the form of a circular arc extends over an angle σ.

A driving maneuver to be executed in order to park the motor vehicle is typically composed of several segments or nominal driving paths in the form of circular arcs that are connected to one another by turning points. In order to exactly execute a driving maneuver that is composed of several segments, i.e., in order to maneuver the motor vehicle into the parking spot in question as easily as possible, the motor vehicle needs to be in a defined position and have a defined orientation at each turning point, i.e., at the starting point and the destination point of each segment.

If the driving path chosen by the driver of the respective motor vehicle deviates from the nominal driving path stored in the memory 3, the nominal center of rotation $D_{nominal}$ is shifted to a deviant center of rotation $D_A$. This means that the motor vehicle no longer moves along the nominal driving path X, but rather along a deviant circular arc $K_A$. Consequently, the motor vehicle can only reach the destination point with the proper orientation if the nominal driving path is corrected.

Figure 5:
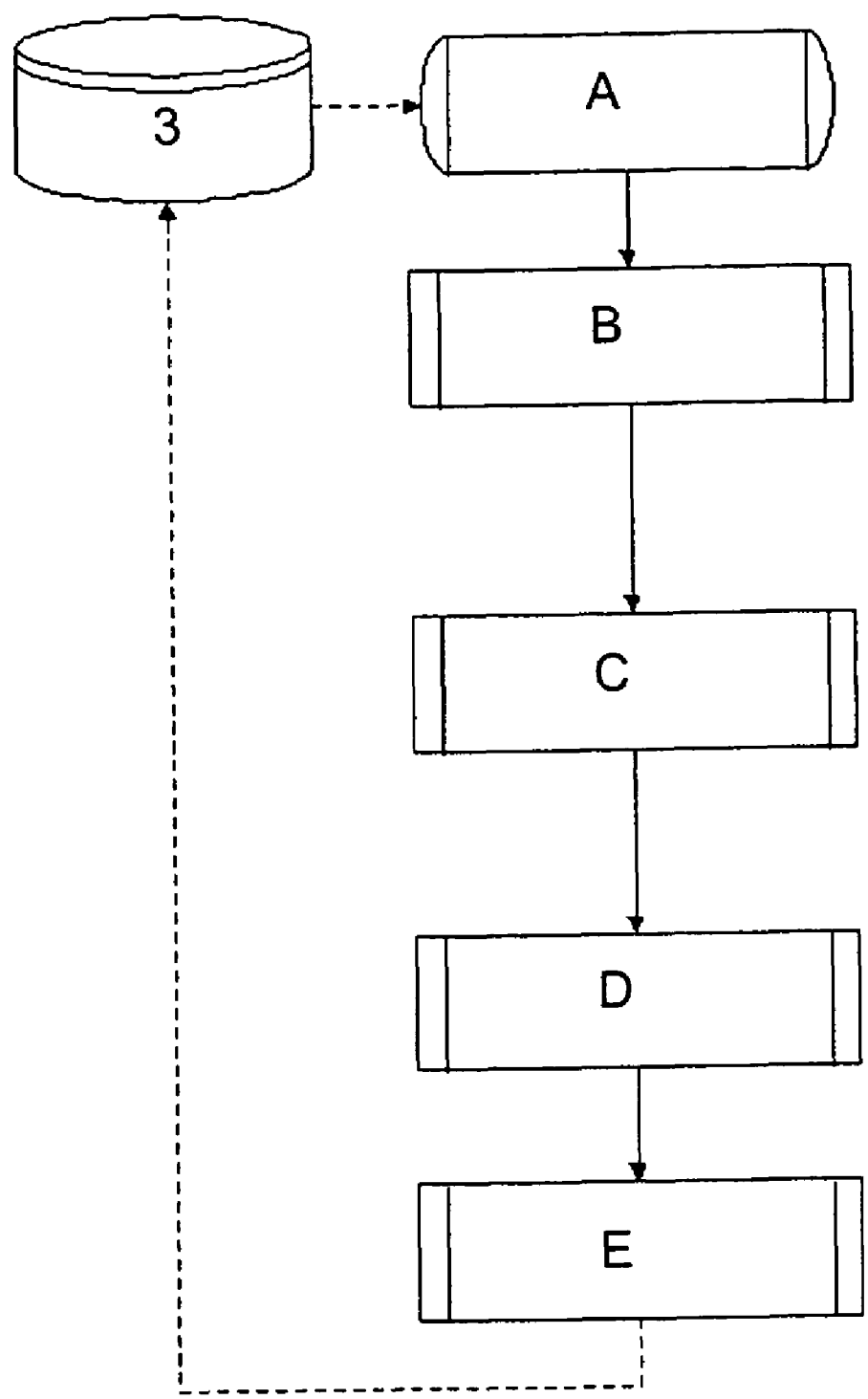
FIG. 5 is a view of a flow chart for carrying out the method according to the invention.

The inventive correction of the deviation from the nominal driving path X is described below with reference to FIGS. 3 and 4 and the flow chart shown in FIG. 5.

The nominal driving path X, i.e., the planned segment, is output by the output unit in a first step A. Subsequently, the driver sets the motor vehicle in motion. An actual position $W_1$ of the motor vehicle and an actual steering angle are determined at a time t that is defined by means of a timing unit and/or results from a certain distance traveled. If the actual position $W_1$ does not lie on the nominal driving path X, a so called deviant circular arc $K_A$ is calculated in step B, wherein said deviant circular arc defines the arc on which the motor vehicle has traveled an angle $\gamma_A$ between the starting point S and the actual position $W_1$. In order to determine the deviant circular arc $K_A$, the coordinates of the actual position $W_1$ and the coordinates of a deviant center of rotation $D_A$ are initially determined on a line hi that is defined by the starting point S and the nominal center of rotation $D_{nominal}$. These coordinates can be determined, for example, by means of the actual steering angle and a displacement sensor or by means of two displacement sensors.

The distance between the starting point S and the deviant center of rotation $D_A$ results in a radius $R_A$. A deviation A is obtained from the difference between the radius $R_A$ and the nominal radius $R_{nominal}$. A line $g_1$ is defined by the actual position $W_1$ and the deviant center of rotation $D_A$. The deviant circular arc $K_A$ is defined by the starting point S, the actual position $W_1$ and the deviant center of rotation $D_A$. On this deviant circular arc $K_A$, the motor vehicle has traveled an angle $\gamma_A$ that is referred to as the deviant steering angle below.

A corrective circular arc $K_2$ is determined in the next step C. For this purpose, a center of rotation $D_2$ is initially determined which lies on a line $h_2$ defined by the destination point $W_{nominal}$ and the nominal center of rotation $D_{nominal}$ and is spaced apart from the destination point $W_{nominal}$ by the distance $R_A$. Subsequently, a line $g_2$ is determined which extends through the center of rotation $D_2$ and forms the deviant steering angle $\gamma_A$ with the line $h_2$. The coordinates of an intermediate point $W_2$ are then determined, wherein this intermediate point lies on the line $g_2$ and is spaced apart from the center of rotation $D_2$ by the distance $R_A$. The corrective circular arc $K_2$ consequently is defined by the intermediate point $W_2$, the destination point $W_{nominal}$ and the center of rotation $D_2$, wherein said corrective circular arc represents a congruent projection of the deviant circular arc $K_A$ and ends at the destination point $W_{nominal}$.

A corrective circular arc $K_1$ that connects the actual position $W_1$ and the intermediate point $W_2$ is determined in the next step D. The corrective circular arc $K_1$ has a center of rotation $D_1$ that lies at the intersecting point between the lines $g_1$ and $g_2$. The angle of rotation $\gamma_A$ for the corrective circular arc $K_1$ results from the difference between the slope of the line $g_2$ and the slope of the line $g_1$. The corrective circular arc $K_1$ is defined by the center of rotation $D_1$, the actual position $W_1$ and the intermediate point $W_2$.

The corrective circular arcs $K_1$ and $K_2$ are then written into the memory 3 for the planned nominal segments in the next step E. In this context, it is important that the corrective circular arc $K_1$ is processed before the corrective circular arc $K_2$. The corrective circular arcs $K_1$ and $K_2$ stored in the memory are then output in the form of driving instructions by the output unit of the device according to the invention in step A. Steps B through E can be repeated if another deviation of the actual motor vehicle position from the newly calculated nominal driving path occurs.

While specific embodiments of the invention have been shown and described in detail to illustrate the application of the principles of the invention, it will be understood that the invention may be embodied otherwise without departing from such principles.

What is claimed is:

1. A method for assisted steering, including the assisted maneuvering and parking, of a motor vehicle, comprising the following steps:
   determining a nominal driving path (X) with a starting point (S) and a destination point ($W_{nominal}$) and a nominal center of rotation ($D_{nominal}$);
   outputting the nominal driving path (X);
   setting the motor vehicle in motion;
   determining an actual position ($W_1$) of the motor vehicle;
   shifting said nominal center of rotation ($D_{nominal}$) to a deviant center of rotation ($D_A$) when movement of said motor vehicle deviates from said nominal driving path;
   determining a deviant circular arc ($K_A$) traveled based on said deviant center of rotation ($D_A$) as well as a first ($K_1$) and a second ($K_2$) corrective circular arc if the actual position ($W_1$) deviates from the nominal driving path (X), wherein the second corrective circular arc ($K_2$) is a congruent projection of the deviant circular arc ($K_A$) and ends at the destination point ($W_{nominal}$), and wherein a corrected nominal driving path ($K_1$, $K_2$) is generated as output; and adjusting movement of said motor vehicle based on said corrected nominal driving path.

2. The method according to claim 1, wherein a deviant center of rotation ($D_A$) for the deviant circular arc ($K_A$) and a distance ($R_A$) between the starting point (S) and the deviant center of rotation ($D_A$) are determined, wherein the deviant center of rotation ($D_A$) lies on a line ($h_1$) that is defined by the starting point (S) and a nominal center of rotation ($D_{nominal}$).

3. The method according to claim 2, wherein a compensative center of rotation ($D_2$) for the second corrective circular arc ($K_2$) is determined on a line ($h_2$) that is defined by the destination point ($W_{nominal}$) and the nominal center of rotation ($D_{nominal}$)), wherein this compensative center of rotation is spaced apart from the destination point ($W_{nominal}$) by a distance that corresponds to the distance between the starting point (S) and the deviant center of rotation ($D_A$).

4. The method according to claim 1, wherein a center of rotation ($D_1$) for the first corrective circular arc ($K_1$) lies in the intersecting point between a line ($g_1$) that is defined by the actual position ($W_1$) and the deviant center of rotation ($D_A$) and a line ($g_2$) that is defined by the compensative center of rotation ($D_2$) and the deviant steering angle ($\gamma_A$).

5. The method according to one of claim 1, wherein the nominal driving path (X) and the corrected nominal driving path ($K_1$, $K_2$) are stored in a memory.

6. The method according to claim 1, wherein the actual position ($W_1$) is determined in accordance with a time dependent and/or distance-dependent clocking.

7. The method according to one of claims 1, wherein the nominal driving path and the corrected nominal driving path are output by means of an optical and/or acoustical and/or mechanical/haptical indicating unit.

8. The method according to claim 1, further comprising triggering an electronic steering aid.

9. The method according to one of claims 1, wherein the nominal driving path and the corrected nominal driving path are output by means of an optical and/or acoustical and/or mechanical/haptical indicating unit.

10. A device for assisted steering including the assisted maneuvering and parking, of a motor vehicle, the device comprising:
    a data processing unit for determining a nominal driving path between a starting point and a destination point, said nominal driving path being defined by said starting point, said destination point and a nominal center of rotation;
    an output unit for providing an output of a nominal driving path;
    a displacement sensor;
    a device for determining whether or not the actual position deviates from the nominal driving path, said device shifting said nominal center of rotation to a deviant center of rotation when movement of the motor vehicle deviates from said nominal driving path;
    a unit that determines a deviant circular arc based on said deviant center of rotation as well as a first and a second corrective circular arc if the actual position deviates from the nominal driving path, wherein the second corrective circular arc is a congruent projection of the deviant circular arc such that said congruent projection extends continuously from an end point of said deviant circular arc to said destination point, said congruent projection terminating at said destination point.

11. The device according to claim 10, further comprising a memory for the nominal driving path.

12. The device according to claim 10, further comprising a steering angle sensor.

13. The device according to claims 10, further comprising two displacement sensors that respectively cooperate with a left wheel and a right wheel of the motor vehicle.

14. A method for assisted steering of a motor vehicle, comprising the steps of:

providing a device for assisted steering including a data processing unit for determining a nominal driving path between a starting point and a destination point, an output unit for providing an output of a nominal driving path, a displacement sensor, a device for determining whether or not the actual position deviates from the nominal driving path and a unit that determines a deviant circular arc as well as a first and a second corrective circular arc if the actual position deviates from the nominal driving path, wherein the second corrective circular arc is a continuous congruent projection of the deviant circular arc and ends at the destination point;

determining a nominal driving path based on a starting point, a nominal center of rotation and the destination point;

providing a nominal driving path as an output;

setting the motor vehicle in motion;

translating said nominal center of rotation to a deviant center of rotation when position of said motor vehicle differs from said nominal driving path;

determining an actual position of the motor vehicle;

determining the deviant circular arc traveled based on said deviant center of rotation as well as the first and the second corrective circular arc if the actual position deviates from the nominal driving path;

providing a corrected nominal driving path as an output; and changing position of said motor vehicle based on said corrected nominal driving path.

15. The method according to claim 14, wherein a deviant center of rotation for the deviant circular arc and a distance between the starting point and the deviant center of rotation are determined, wherein the deviant center of rotation lies on a line that is defined by the starting point and a nominal center of rotation.

16. The method according to claim 15, wherein a compensative center of rotation for the second corrective circular arc is determined on a line that is defined by the destination point and the nominal center of rotation, wherein this compensative center of rotation is spaced apart from the destination point by a distance that corresponds to the distance between the starting point and the deviant center of rotation.

17. The method according to claim 14, wherein a center of rotation for the first corrective circular arc lies in the intersecting point between a line that is defined by the actual position and the deviant center of rotation and a line that is defined by the compensative center of rotation and the deviant steering angle.

18. The method according to one of claim 14, wherein the nominal driving path and the corrected nominal driving path are stored in a memory.

19. The method according to claim 14, wherein the actual position is determined in accordance with a time dependent and/or distance-dependent clocking.

20. The method according to claim 14, further comprising triggering an electronic steering aid.

* * * * *